United States Patent
Perronnin (10) Patent No.: US 7,574,349 B2
(45) Date of Patent: Aug. 11, 2009

(54) STATISTICAL LANGUAGE-MODEL BASED SYSTEM FOR DETECTION OF MISSING ATTACHMENTS

(75) Inventor: Florent C. Perronnin, Saint Martin d'Hères (FR)

(73) Assignee: Xerox Corporation, Norwalk, CT (US)

( * ) Notice: Subject to any disclaimer, the term of this patent is extended or adjusted under 35 U.S.C. 154(b) by 493 days.

(21) Appl. No.: 11/392,194

(22) Filed: Mar. 29, 2006

(65) Prior Publication Data

US 2007/0233459 A1 Oct. 4, 2007

(51) Int. Cl.
*G06F 17/27* (2006.01)
(52) U.S. Cl. .................. 704/9; 707/2; 707/6; 709/206; 715/205; 715/255; 715/256
(58) Field of Classification Search ............. 704/9, 704/1, 10; 707/1–6; 726/22; 709/206; 715/205, 715/255, 256
See application file for complete search history.

(56) References Cited

U.S. PATENT DOCUMENTS

| | | | | |
|---|---|---|---|---|
| 6,073,133 | A * | 6/2000 | Chrabaszcz | 707/10 |
| 6,144,934 | A * | 11/2000 | Stockwell et al. | 704/1 |
| 6,415,250 | B1 * | 7/2002 | van den Akker | 704/9 |
| 6,970,908 | B1 * | 11/2005 | Larky et al. | 709/206 |
| 7,007,066 | B1 * | 2/2006 | Malik | 709/206 |
| 7,016,937 | B1 * | 3/2006 | Malik | 709/206 |
| 7,092,993 | B2 * | 8/2006 | Goldberg | 709/206 |
| 7,120,613 | B2 * | 10/2006 | Murata | 706/12 |
| 7,130,887 | B2 * | 10/2006 | Goldberg | 709/206 |
| 7,191,116 | B2 * | 3/2007 | Alpha | 704/8 |
| 7,209,951 | B2 * | 4/2007 | Goldberg | 709/206 |
| 7,478,038 | B2 * | 1/2009 | Chelba et al. | 704/10 |
| 2002/0138579 | A1 * | 9/2002 | Goldberg | 709/206 |
| 2003/0041261 | A1 * | 2/2003 | Shukan | 713/200 |
| 2005/0257159 | A1 | 11/2005 | Keohane et al. | |
| 2007/0100946 | A1 * | 5/2007 | Kairis, Jr. | 709/206 |

FOREIGN PATENT DOCUMENTS

| EP | 1 087 315 A2 | 9/2003 |
|---|---|---|
| WO | WO 01/27828 A2 | 4/2001 |

OTHER PUBLICATIONS

P. Clarkson, R. Rosenfeld, *Statistical Language Modeling Using the CMU-Cambridge Toolkit*, Eurospeech, 1997.

Michiel Bacchiani, Brian Roark, *Unsupervised Language Model Adaptation*, ICASSP, 2003.

J. Goodman, J. Gao, *Language Model Size Reduction by Pruning and Clustering*, ICSLP, 2000.

(Continued)

*Primary Examiner*—David R Hudspeth
*Assistant Examiner*—Lamont M Spooner
(74) *Attorney, Agent, or Firm*—Fay Sharpe LLP (57) ABSTRACT

A method for processing electronic mail includes computing a probability that a text string in an electronic mail message refers to an attachment as a function of a stored probability value for each of a plurality of sequences of words within the text string. Where the email message lacks an attachment, the method includes prompting a user if the computed probability indicates that the text string refers to an attachment.

18 Claims, 5 Drawing Sheets

OTHER PUBLICATIONS http://www.attachmentglue.com/about_sotware.html, printed Aug. 2005.

http://www.extravalent.com/software/mac.html, printed Aug. 2005.

http://www/emailaddressmanager.com/outlook/alerts.html, printed Aug. 2005.

* cited by examiner

STATISTICAL LANGUAGE-MODEL BASED SYSTEM FOR DETECTION OF MISSING ATTACHMENTS

BACKGROUND

The exemplary embodiment relates to email processing. It finds particular application in connection with a system for the detection of missing email attachments and will be described with particular reference thereto.

Email allows a person to send textual messages electronically to other email users anywhere in the world. Frequently, other information, such as, for example, word processing documents, images, spreadsheet files, executable files, and audio files, is appended to the email in the form of an attachment. An email system typically involves a server-based mail program residing on a server computer to manage the exchange of email messages over one or more networks and a client-based email program residing on the client to implement a mail box that receives and holds the email messages for a user. Typically, these client-based programs also include a graphical user interface to enable a user to easily and conveniently open and read email messages in addition to creating new email messages.

An email user will typically create a message using an email program running on a computer connected to a computer network, such as a local area network (LAN), a wide area network (WAN), or the Internet. The message will include an email "address" for the intended recipient. When the user has finished entering the message, the user may "send" the message to the intended recipient. The email program then electronically transmits the message over the computer network. The recipient, using an email program running on the recipient's computer, can then "receive" the message.

It is not uncommon for an email user to forget to attach a document before hitting the send button. Systems have been developed to alert a user before a message has been sent of the absence of an attachment. One approach is to prompt a user every time an email message is to be transmitted as to whether or not an attachment is desired. However, this expends user time which is unnecessary in most cases. As a result, a user may disable such a system and rely on memory.

Another approach is to scan the content of an email for words which suggest that the user wanted to attach a document. When the user tries to send the email, in the case where such words are detected and no document is attached, a dialog box is opened to ask the user if he wants to send the email as is, or if he wants to attach one or multiple attachments prior to sending the email.

Such systems are based on a simple word spotting approach: if a word which belongs to a predefined "watch list" (such as "attached," "enclosed," or "file") is detected in the email, a warning is issued. Such an approach can result in either a high missed detection rate or a high false detection rate, depending on the size of the watch list. For example, if the word "presentation" were to be included in the watch list, a message such as "I still haven't had time to look at your presentation." would result in a false detection. On the other hand, if it is not included, a message such as "Here is the presentation your requested." would result in a missed detection.

CROSS REFERENCE TO RELATED PATENTS AND APPLICATIONS

U.S. Pat. No. 6,970,908 to Larky, et al. discloses a method for automatically determining, and accordingly prompting an email user as to whether an attachment is to accompany an email message prior to transmission of the message. The method relies on a database of certain addressees to whom attachments are frequently transmitted.

BRIEF DESCRIPTION

Aspects of the exemplary embodiment disclosed herein include a method and a system for processing electronic mail, a computer program product, and a development method.

In one aspect, a method for processing electronic mail includes computing a probability that a text string in an electronic mail message refers to an attachment as a function of a stored probability value for each of a plurality of sequences of words within the text string. Where the email message lacks an attachment, the method includes prompting a user if the computed probability indicates that the text string refers to an attachment.

In another aspect, a system for processing electronic mail includes a statistical language model which stores probability values for a plurality of text sequences and a processor which executes instructions for retrieving stored probability values from the statistical language model for a plurality of text sequences in the email message and instructions for computing a probability that that the electronic mail message refers to an attachment as a function of the retrieved probability values.

In another aspect, a computer program product includes a computer-usable data carrier storing instructions that, when executed on a computer, cause the computer to perform a method. The method includes computing a probability that a text string in an electronic mail message refers to an attachment as a function of a stored probability value for each of a plurality of sequences of words within the text string. Where the email message lacks an attachment and the computed probability indicates that the text string refers to an attachment, the method includes prompting a user.

In another aspect, a method for processing electronic mail includes analyzing words of at least one text string of an electronic mail message with a statistical language model to determine whether the text string has at least a threshold probability of referring to an attachment and, where the email message lacks an attachment, prompting a user if the text string is determined to have at least the threshold probability that the text string refers to an attachment.

In another aspect, a method for developing a statistical language model includes establishing a first set of probability values for sequences of words found in a first corpus of sentences of electronic mail messages which are determined to refer to an attachment as a function of a frequency of their occurrence in the first corpus and establishing a second set of probability values for sequences of words found in a second corpus of sentences of electronic mail messages which are determined not to refer to an attachment as a function of a frequency of their occurrence in the second corpus.

DETAILED DESCRIPTION

The exemplary embodiment relates to a system for processing electronic mail including an attachment verification system which checks for missing attachments to electronic mail messages, such as email attachments, to a method for processing electronic mail, and to a method for developing such a system. The exemplary method utilizes a statistical language model (SLM) to analyze emails prior to sending them. In various aspects, the attachment verification system scans the content of an email for text strings that imply that the user might have wanted to attach a document. The text string may be a sentence or a sequence of a fixed number of words. When the user tries to send the email, if the attachment verification system is confident that the user wanted to attach a document and if no document is attached, a dialog box is opened to ask the user if he wants to send the email as is, or if he wants to attach a document (or multiple documents) prior to sending the email.

The exemplary verification system may determine a probability that a message refers to an attachment as a function of stored probability values for a plurality of text sequences in the message. For convenience, unless otherwise noted, a "probability value" can refer herein to a statistical probability, a log-probability, a probability distribution, or other function relating to the likelihood that a particular text sequence refers to an attachment.

As used herein, a "document" refers generally to any email attachment, such as a text document, spreadsheet, report, form, image file, audio file, audiovisual data files, database contents, combinations thereof, and the like.

A "text sequence" generally refers to a contiguous sequence of words of at least two words in length (such as an N-gram), which is shorter in length than a text string.

The SLM enables the detection of omitted attachments with greater precision that can be achieved with simple keyword searching. Compared to existing systems based on simple word spotting, an approach based on a language model can significantly reduce the probability of missed detections, i.e., the probability that the attachment verification system does not detect that the user intended to attach a document. The use of an SLM can also greatly reduce the probability of false detections, i.e., the probability that the attachment verification system spuriously detects a sentence which the attachment verification system detects as indicative of an omitted attachment. As will be appreciated, a high false detection rate can be an inconvenience to the user and prompt the user to disable the system.

In one aspect, the SLM may be adapted to the specific writing patterns of the user through incremental learning.

The exemplary attachment verification system may be integrated into a conventional mailing program, for example as a plug in, or may be offered as a service from a server. In general, the attachment verification system is specific to the natural language in which it was developed, such as English or French. A mailing program may include a plurality of attachment verification systems, each for a different natural language.

Figure 1:
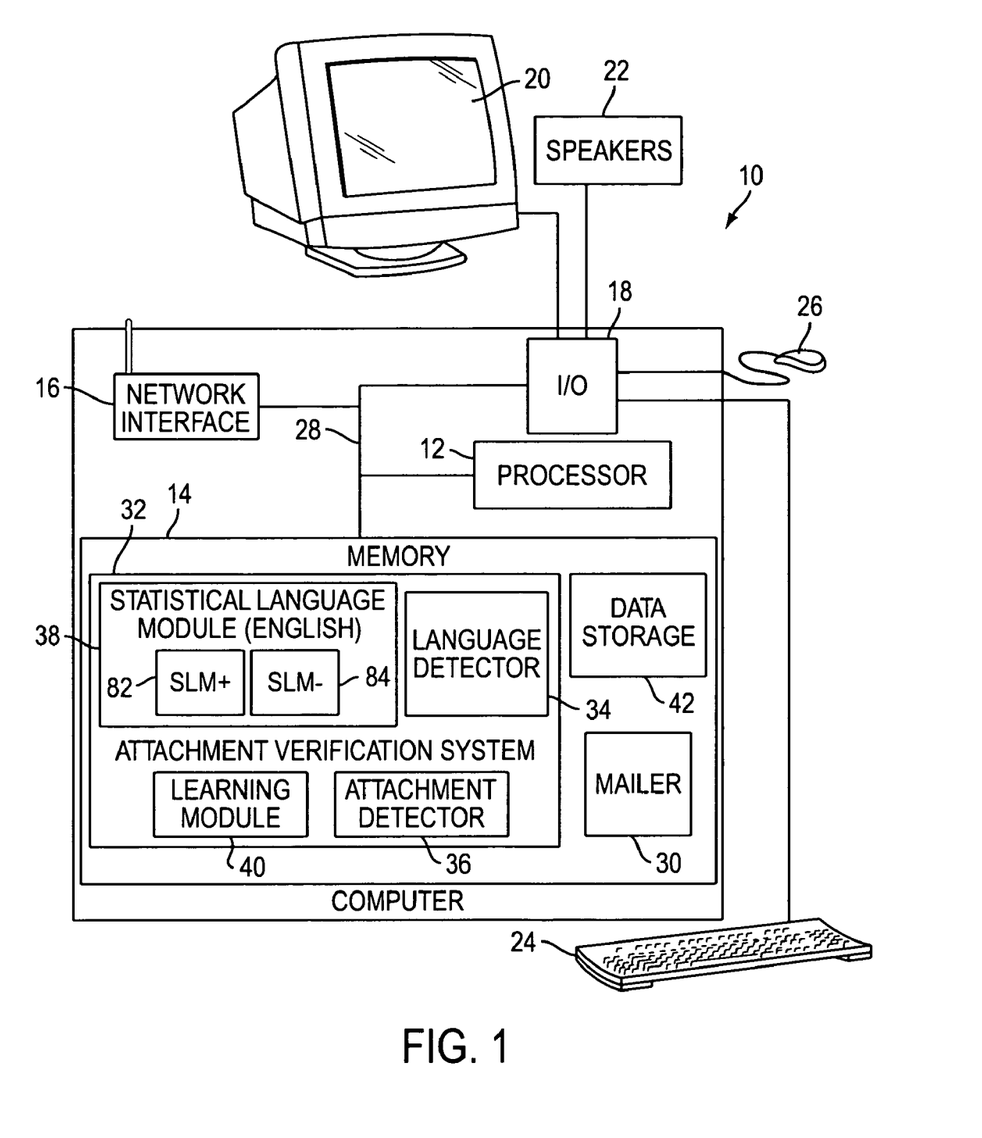
FIG. 1 is a functional block diagram of a computer system comprising an attachment verification system according to one aspect of the exemplary embodiment.

With reference to FIG. 1, a functional block diagram of a computer system 10 is shown. The computer system is capable of prompting an email sender as to whether an attachment is to accompany an email message prior to transmission of the message. The illustrated computer system 10 includes a processor 12, which controls the overall operation of the computer system 10 by execution of processing instructions which are stored in memory 14 connected to the processor 12. Computer system 10 also includes a network interface 16 and a user input output interface 18. The I/O interface 18 may communicate with one or more of a display 20, for displaying information to users, speakers 22, and a user input device, such as a keyboard 24 or touch or writable screen, for inputting text, and/or a cursor control device 26, such as mouse, trackball, or the like, for communicating user input information and command selections to the processor 12. The various components of the computer 10 may be all connected by a bus 28. The processor 12 executes instructions for performing the method outlined in FIG. 4 and/or FIG. 5. The computer system 10 may be a PC, such as a desktop, a laptop, palmtop computer, portable digital assistant (PDA), cellular telephone, pager, or other communication system with email capability.

The memory 14 may represent any type of computer readable medium such as random access memory (RAM), read only memory (ROM), magnetic disk or tape, optical disk, flash memory, or holographic memory. In one embodiment, the memory 14 comprises a combination of random access memory and read only memory. In some embodiments, the processor 12 and memory 14 may be combined in a single chip. The network interface 16 allows the computer to communicate with other devices via a computer network, such as a local area network (LAN) or wide area network (WAN), or the internet, and may comprise a modulator/demodulator (MODEM).

As will be appreciated, FIG. 1 is a high level functional block diagram of only a portion of the components which are incorporated into a computer system 10. Since the configuration and operation of programmable computers are well known, they will not be described further.

Figure 2:
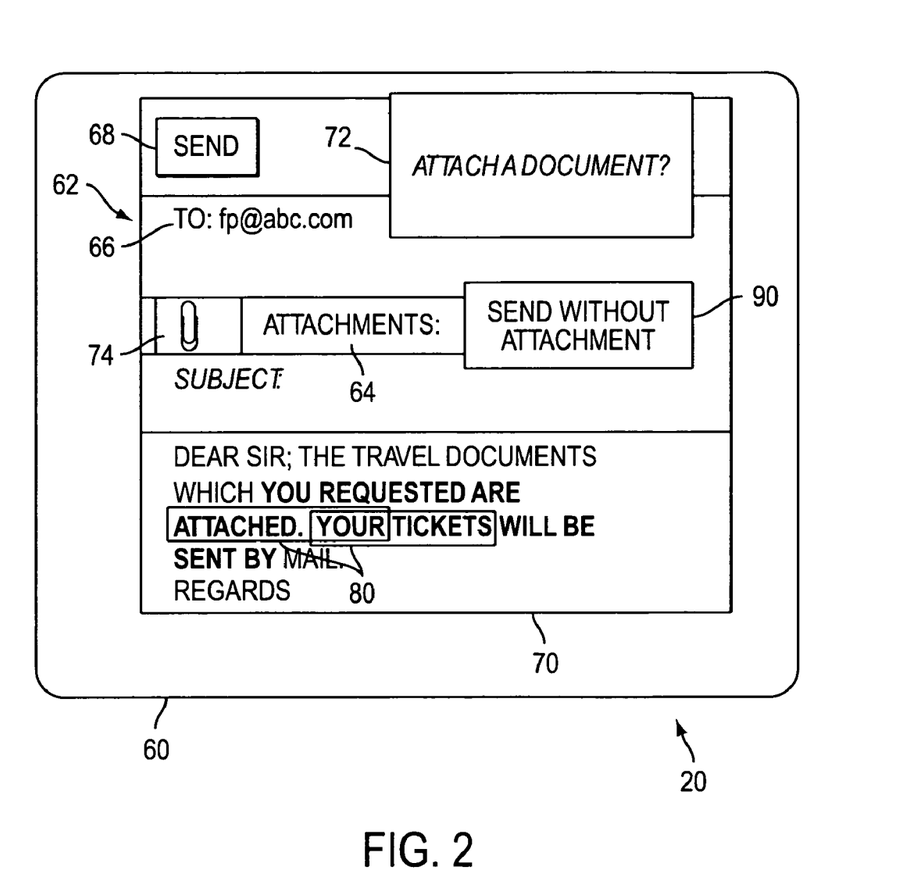
FIG. 2 illustrates an exemplary screen shot displayed on a display of the computer system of FIG. 1 during a verification of an email attachment.

The computer system 10 includes an email program or mailer 30 in memory 14 which contains computer program instructions for implementing an electronic mail application for creating and sending email messages and attachments. Electronic mail applications, such as are well known, such as Microsoft Outlook™ and Netscape Messenger™. The exemplary email program contains additional functionality which is represented in FIG. 2 as an attachment verification system 32. The attachment verification system 32 may be a plug in for the mailer 30. The illustrated verification system 32 includes a language detection module 34, an attachment detector 36, a statistical language model (SLM) 38, and a learning module 40. The language detection module 34 includes instructions for detecting the language used in an email. The attachment detector 36 includes instructions for detecting whether a document is attached to the email. As will be described in further detail herein, the statistical language model 38 includes stored probability values for text sequences. These probability values may be retrieved by the processor for computing a probability that an email contains an attachment, which may be output as a binary (Yes/No) decision. The learning module 40 adapts the statistical language model 38 based on email language patterns used by the operator of the computer system. Documents for attachment may be stored as files in data storage 42 or retrieved from a server on the network.

Figure 4:
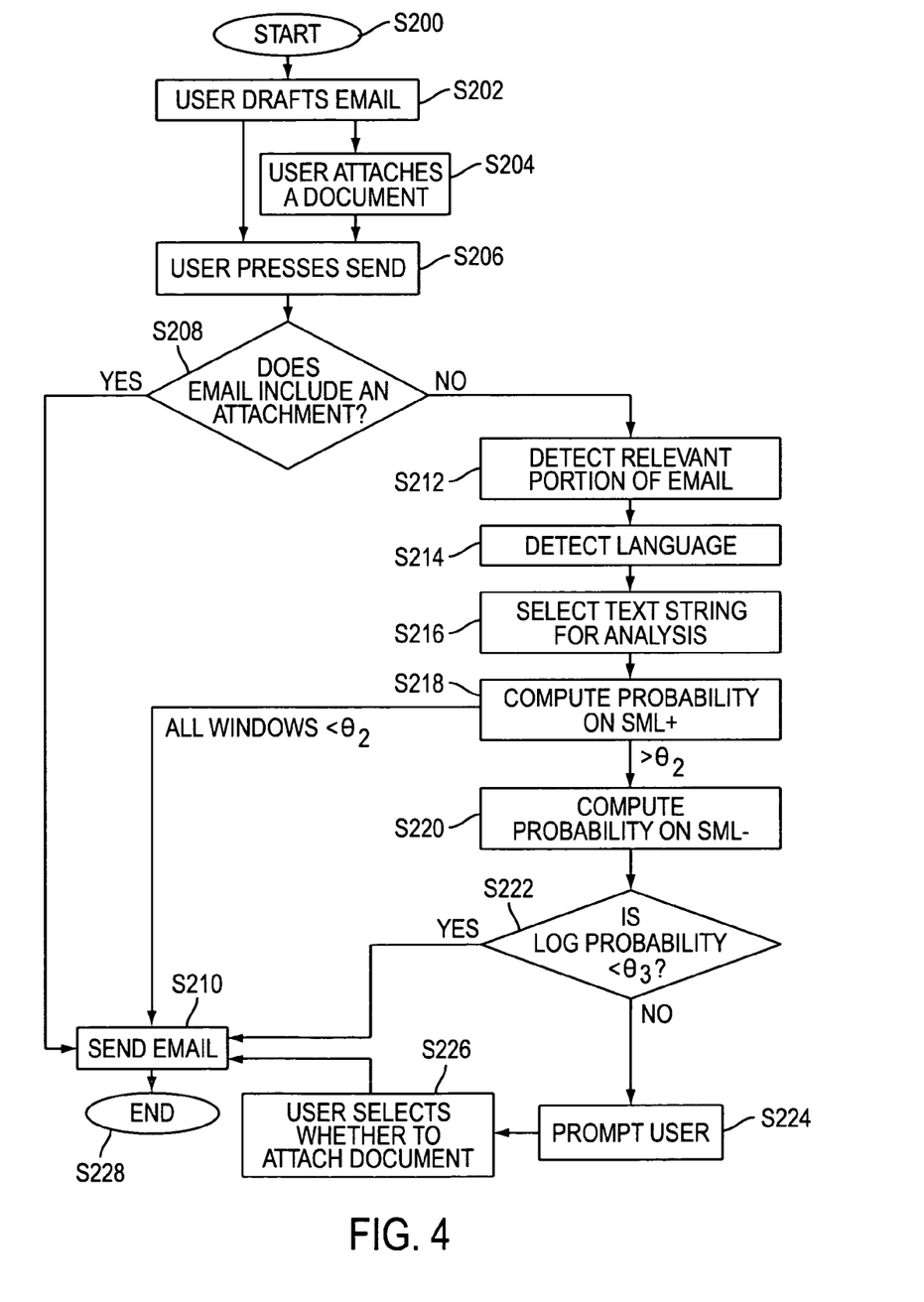
FIG. 4 is a flow diagram of a method for detecting a missing email attachment according to one aspect of the exemplary embodiment.
Figure 5:
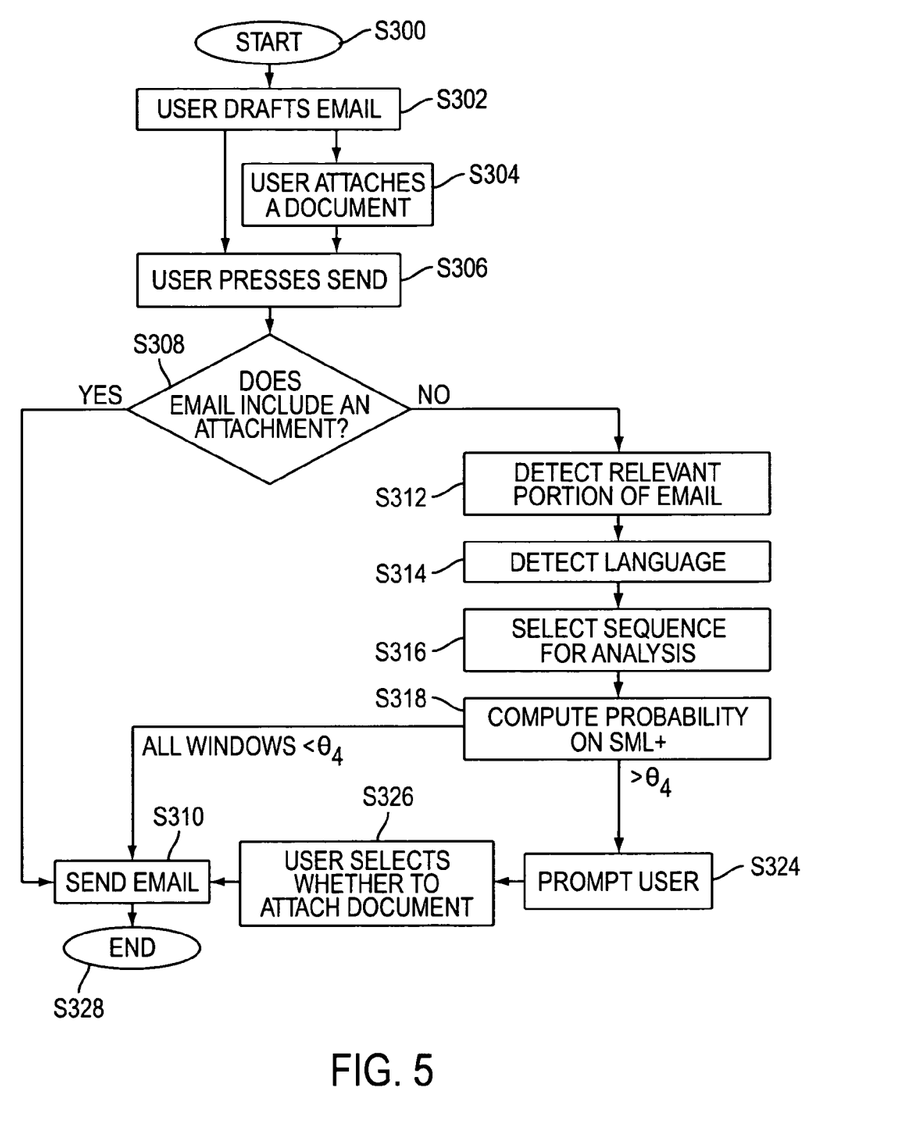
FIG. 5 is a flow diagram of a method for detecting a missing email attachment according to another aspect of the exemplary embodiment.

The attachment verification system 32 includes processing instructions for each of the steps outlined in FIG. 4 or FIG. 5 which are executed by the processor. These may include instructions for computing a probability that a text string in an email refers to an attachment using the statistical language model 38 and for prompting an email user regarding whether an attachment is to accompany an email message prior to transmission of the message. The attachment verification system 32 processing instructions may be stored in the form of any of the memory components described above. In one embodiment, a computer program product, such as a disk or other storage device is used for installing the instructions on the computer system or the instructions may be provided to the computer system via a server. It will be appreciated that while the illustrated processing instructions stored in memory 14 for executing the exemplary method are illustrated as a plurality of modules, it is to be appreciated that the modules may be combined in a single program.

FIG. 2 illustrates a simulated screen shot 60 on the display 20, which depicts a simple sample email message 62 to be sent by a user. The message 62 bears no attachment, as indicated by an attachment field 64 (which may not be displayed on the screen at this time), and has one or more addressees listed in the 'to' field 66. A 'send' screen button 68 may be activated by a user applying a cursor control movement. The on-screen cursor may be manipulated by a user to place it on the 'send' screen button 68 (and/or any of the subsequent screen buttons discussed below). The action of the 'send' screen button may be triggered by a click action triggering feature, e.g., as on the mouse 26. Activation of the 'send' screen button 68 is detected by the attachment verification system 32. Although not visible to a user, a window 70 of K words of email message 62 analyzed by the attachment verification system 32 has prompted the processor to display a dialog box 72. The window 70 is highlighted for illustration purposes only. As will be appreciated, the screen 20 may display many other fields and selectable buttons or icons than those discussed herein.

Upon attaching a document by the action of an 'attachment' screen button 74, the attachment is automatically listed in an identifiable form in the 'attachment' field 64. The learning module 40 (FIG. 1) may include instructions for recording and analyzing the content of an email when a user determines not to attach a document with an email following display of a user prompt in dialog box 72.

The attachment verification system 32 described herein is not limited to the embodiments illustrated in FIGS. 1 and 2 and may be established in the memory, and/or processor of a computer system or on a server.

The verification system 32 processing instructions automatically make a decision as to whether a user intended to attach a document as a function of the stored statistical probabilities that sequences of words of predetermined length (N-grams) which are found in a text string in the email message 62 refer to an attachment. For example, in the screen shot of FIG. 3, the highlighted portion of text in window 70 represents a text string under analysis which may be subdivided into N-grams 80, each comprising a fixed number of words (two words in the illustrated embodiment). Overlapping N-grams may be considered in computing the probability, as shown. Only two N-grams are illustrated in FIG. 2 for simplicity. However, it is to be appreciated that each N-gram in the text string may be considered in computing the overall probability that the user intended to attach a document.

The detection of the presence or absence of a reference to an attachment in an email can be treated as a two-class decision problem. Within the Bayesian decision framework, if E is the email under consideration and if A and $\bar{A}$ denote respectively the hypotheses "there is a reference to an attachment" and "there is no reference to an attachment," detection may be based on a function of the probabilities of each hypothesis, such as the following log-probability difference:

$$\log P(E|A) - \log P(E|\bar{A}) \qquad \text{Eqn. 1}$$

The statistical language model 38 may thus be used to detect text strings which suggest that a document should be attached to the email. The exemplary SLM 38 models the probability distribution of sequences of words in the body of the email. In an attachment verification system 32 which considers both A and $\bar{A}$, the statistical language model 38 may include two SLM components, one for each of the two hypotheses. More precisely, a first SLM component 82 (FIG. 1) may be used to model $P(E|A)$, i.e. the distribution of sequences of words in text strings (such as sentences or fixed length text strings) referring to an attachment, and a second SLM component 84 may be used to model $P(E|\bar{A})$, i.e. the distribution of sequences of words in those text strings which do not refer to an attachment. These two SLM components 82, 84 are referred to herein as SLM+ and SLM−, respectively.

Alternatively, the detection of the presence of a reference to an email attachment may be considered as a single class problem which considers, for example, only the probability of the email with respect to one of the hypotheses, such as the first hypothesis: "there is a reference to an attachment." In general, for a single hypothesis detection system only SLM+ would be considered. However, the two-hypothesis system generally provides a more robust detection system. One reason for this is that several generic words (such as "the" or "a") have a high probability of appearing in any sentence, thus, they also have a high probability of appearing in those sentences referring to an attachment. Accordingly, SLM+ tends to reflect the high frequency of those words. As a consequence, sentences containing these frequent words tend to score high on SLM+, leading to the possibility of a false detection. One benefit of using SLM− is thus to mitigate the influence of these generic frequent words in the scoring process.

The attachment verification system 32 will be described herein primarily in terms of the two hypothesis system, although it will be readily appreciated that the attachment verification system may be readily adapted to consider only the single hypothesis.

The exemplary SLM 38 is an N-gram model. In an N-gram model, the probability of a word conditioned on all the preceding words is considered to be equal to the probability of the word conditioned on the N−1 previous words only. Thus, if N=2 (a bi-gram), the probability of the frequency of occurrence of a word in combination with the one immediately previous word is considered. In the case of a tri-gram, the probability of the word in combination with the two previous words is considered. For example, let $W=\{w_1, w_2, \ldots w_T\}$ be a string of T words (e.g. a sentence or other text string) and let $w_n$ be one of the words in the string. In the case of a bi-gram model:

$$P(w_n|w_{n-1}, w_{n-2}, \ldots w_1) \equiv P(w_n|w_{n-1}) \qquad \text{Eqn. 2}$$

In the case of a tri-gram model:

$$P(w_n|w_{n-1}, w_{n-2}, \ldots w_1) \equiv P(w_n|w_{n-1}, w_{n-2}) \qquad \text{Eqn. 3}$$

The N-gram may be a larger sequence of words, such as four, five, or six words. However, since the probabilities in the exemplary embodiment are derived from a corpus of actual emails, the infrequency of occurrence of combinations of four or more words in the corpus can result in inaccuracies in the computation of the probabilities. For practical purposes, a bi-gram or tri-gram model generally gives good results.

In the following discussion, $h_n$ denotes the history of word $w_n$. For the bi-gram $h_n=(w_{n-1})$ and for the tri-gram $h_n=(w_{n-1}, w_{n-2})$. The probability P(W) of a text string W of n words can be computed as the product of the individual probabilities for the N-grams stored in the SLM as follows:

$$P(W)=P(w_T|h_T)*P(w_{T-1}|h_{T-1})\ldots *P(w_1|h_1) \quad \text{Eqn. 4}$$

For a word which has no history, such as $P(w_1|h_1)$, where $h_1$ is null, then the probability is treated as $P(w_1)$ which is simply the probability of observing the word $w_1$.

Alternatively, only the words which have a full history within the window are used to compute the probability P(W). Thus, for a bigram model, the last term $P(w_1|h_1)$ is not included and for a trigram model, the last two terms are not included. i.e., $$P(W)=P(w_T|h_T)*P(w_{T-1}|h_{T-1})\ldots *P(w_2|h_2)$$

For computational stability reasons, since the some of the probabilities can be relatively low, it is generally more efficient to compute the log-probability as the sum of the individual probabilities:

$$\log P(W)=\log P(w_T|h_T)+\log P(w_{T-1}|h_{T-1})+\ldots+\log P(w_1|h_1) \quad \text{Eqn. 5}$$

Once again, the last term may be omitted (in the case of a bi-gram). The statistical language model 38 stores probability values for a set of N-grams, e.g., as probabilities themselves or as a log of the probability. Where two SLMS are employed, SLM+ includes a first set of probability values and SLM– includes a second set of probability values.

Figure 3:
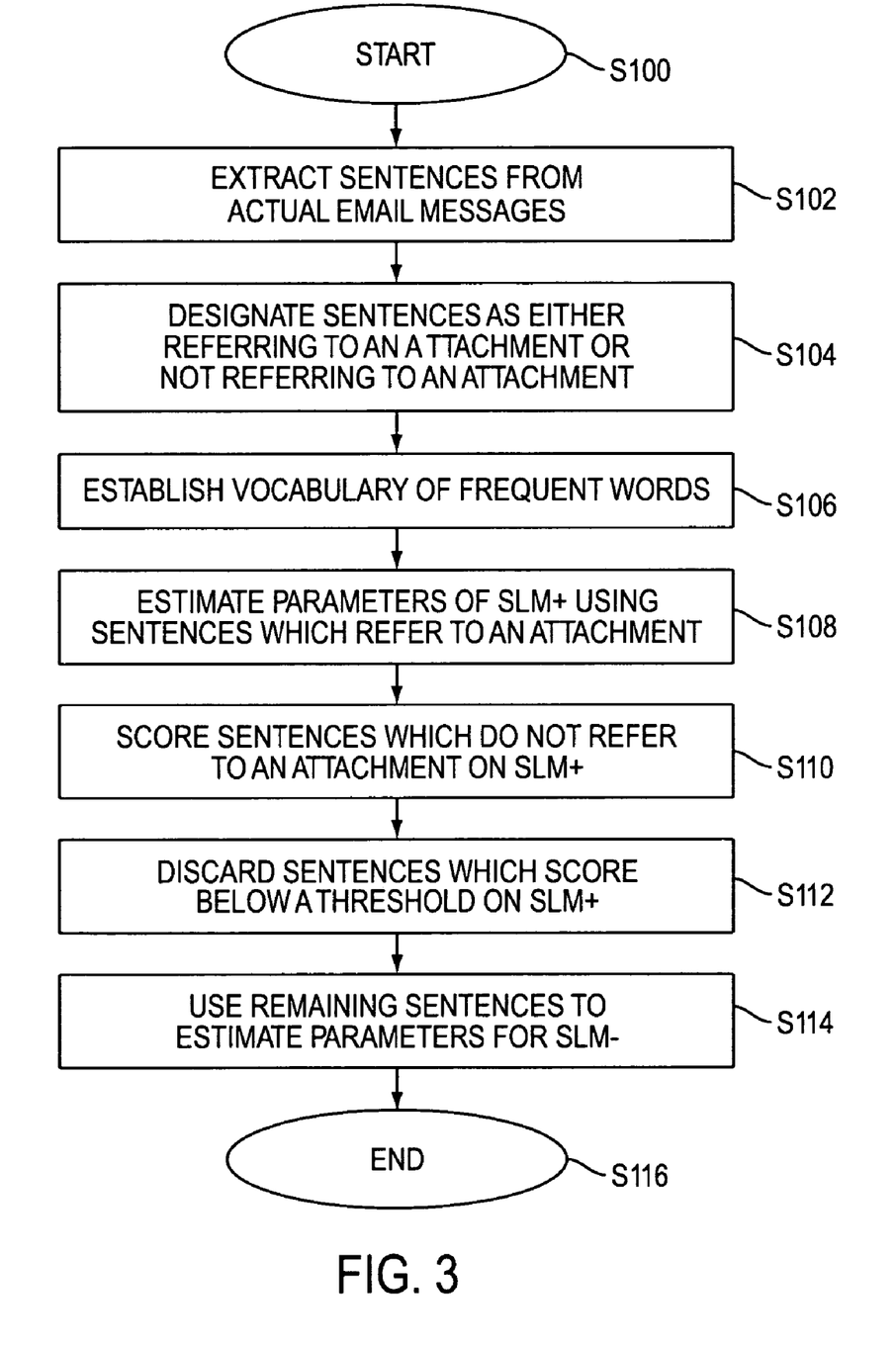
FIG. 3 is a flow diagram of a method of developing an attachment verification system according to one aspect of the exemplary embodiment.

With reference to FIG. 3, an exemplary method of developing an SLM 38 is illustrated. It is to be appreciated that fewer or more steps may be included and that the steps need not proceed in the order illustrated. The method begins at step S100. At step S102, a corpus of text strings, e.g., sentences, is extracted from emails. All of the sentences may be in the same natural language, i.e., in the natural language selected for the attachment verification system 38. The corpus may comprise text strings from actual emails. By including emails from a wide variety of email senders, the corpus is more likely to include a representative sample of typical expressions used when email attachments are present.

In one embodiment, the method is fully automated. In another embodiment, a supervised learning approach is used in which a human editor selects sentences for inclusion in the training corpus.

Prior to analysis of the sentences, natural language processing techniques may be used to tokenize the sentence. This process simply identifies the words in the sentence as a sequence of individual tokens suitable for further processing. Optionally, the tokenized words may be lemmatized, i.e., reduced to a root word. For example, the words "attaching" and "attached" may be analyzed under the common root "attach," and the word "documents" analyzed as "document." Other natural language processing techniques are also contemplated.

At step S104, the sentences in the corpus are designated as belonging to one of two corpora, namely a first training corpus comprising a set of text strings which indicate that a document is attached and a second training corpus comprising a set of text strings which do not. The human editor may select the sentences which make specific reference to email attachments. The first corpus may include sentences such as: "Please find enclosed the final version of the report." or "Here is the presentation in pdf format," and the like. Alternatively, the SLM+ component may be trained on sentences extracted, without human supervision, from emails which include attachments. While the latter approach may be less accurate, the possibility of examining a substantially larger training corpus may improve the outcome in some cases. In one embodiment, the first corpus may be extracted automatically by extracting sentences which include at least one of a set of keywords. The set of keywords may include those commonly used when refereeing to an attachment, such as "file," "attach," "include," etc. However, this approach can miss some sentences which use words omitted from the keyword set as well as necessarily being over-inclusive.

At step S106, the training of SLM+ begins. The SLM+ can be trained on the first training corpus of sentences developed at step S104 (i.e., those indicating that a document was attached to an email). At step S106, a vocabulary of frequently used words in the first corpus may be built. For example, only the 100 or 1000 most frequently used words in the first training corpus are identified. Placing a cap on the vocabulary size (e.g. 100) helps to keep the memory requirements as low as possible, although in some circumstances, this may not be an issue and this step may be omitted. In the exemplary embodiment, the first training corpus is scanned and the frequency of each word computed. Only the most frequent words are kept. In the present case, the vocabulary generally contains words such as "file," "attachment," "enclosed," "find," etc. The most infrequent words, or all other words and other character strings, such as numbers, encountered, may be gathered under a new word "oov" (which stands for "out of vocabulary").

The oov word can be used like any other word. For example, consider the following sentence: "You will find the pdf attached to this email." Assume that all words are frequently used except for pdf. Then the sentence is equivalent to: "You will find the oov attached to this email". Hence, in a bigram model, the log-likelihood of this sentence may be determined from:

log P(email|this)+log P(this|to)+log P(to|attached)+
  log P(attached|oov)+log P(oov|the)+log
  P(the|find)+log P(find|will)+log P(will|You)+log
  P(You)

At step S108, the parameters of the language model SLM+ are estimated. For example, existing closed-form solutions for the Maximum Likelihood Estimation (MLE) of the distribution of an N-gram may be used. For example, let w be a word and h be a history for the word in a sequence of N–1 words. Let c(h) be the number of occurrences of the sequence h and c(h,w) be the number of occurrences of the sequence (h,w) in the first training corpus. Then the estimate of the probability P(w|h) for the sequence (h,w) can be represented as a ratio:

$$P(w|h)=c(h,w)/c(h) \quad \text{Eqn. 6}$$

This process is repeated for all of the words in the first training corpus and the probabilities stored in the SLM+.

It is to be appreciated that other, often more elaborate methods exist for training an SLM. Methods also exist for alleviating the problem of insufficient training data in the case where N is large. Details of such methods can be found, for example, in P. Clarkson and R. Rosenfeld, "Statistical Language Modeling Using the CMU-Cambridge Toolkit," Eurospeech, 1997.

At step S110, the SLM– training begins (if SLM– is to be used in the model 38). The SLM– can be trained with sentences which do not refer to an attachment. These sentences may be extracted without the assistance of a human editor. It will be appreciated that the set of all possible sequences of words which do not refer to an attachment is almost equal to the set of all possible sequences of words. An SLM– which could model any sequence of words in English would require a very large vocabulary size (a few tens of thousands of words) and would therefore contain a huge number of transitions (several millions of parameters). As a result, the amount of memory for this application would be extremely large. See, for example, J. Goodman and J. Gao, "Language Model Size Reduction by Pruning and Clustering," ICSLP, 2000.

To limit the vocabulary size, and thus the number of parameters, the set of sentences which are scored on SLM− may be restricted to cover primarily ambiguous cases. For example, SLM− may be trained only or primarily on those sentences from the second corpus which score sufficiently high on SLM+. Sentences which score high on SLM+ are generally those which are adequately modeled by the vocabulary of SLM+ and thus the same restricted vocabulary can be used for SLM−. The first step of the training of SLM− may include scoring a set of emails which do not refer to an attachment (i.e., by implication, since no attachment was sent) against SLM+. All the sentences (or fixed length text strings within them) which have a log-probability below a threshold $\theta_1$ are discarded (step S112). The sentences with a log-probability above $\theta_1$ are used to train SLM− (Step S114).

An example of a sentence which scores high on SLM+ but which does not actually refer to an attachment might be: "The document you requested is here: /opt/ipc2". The threshold $\theta_1$ can be set such that, on a development set containing only sentences referring to an attachment, no sentence is rejected (or a minimal acceptable proportion, e.g., <5% or <1% of such sentences are rejected).

As with SLM+, an N-gram module may be used to attribute probabilities to combinations of two (or more) words in these sentences, but in this case, it is the probability associated with the second hypothesis. The probabilities are stored in the SLM− model. The method ends at step S116.

Since the vocabulary size of SLM+ (and consequently the number of parameters to estimate) is limited, training SLM+ does not require large amounts of training material. For example, a useful SLM+ may be generated with from a few hundred to a few thousand sentences. Moreover as the SLMs can be trained on a very specific domain with a limited vocabulary size, the number of parameters and thus the memory requirements are relatively modest.

With reference now to FIG. 4, a method of detecting an omitted email attachment is illustrated which employs the two-hypothesis model developed by the method of FIG. 3. It is to be appreciated that fewer or more steps may be included and that the steps need not proceed in the order illustrated.

The method begins at step S200. At step S202, a user drafts an email and at step S204, may select a document to attach to the email. At step S206, the user selects to send an email which has been written. For example, the user clicks on the send button 68 in the email window of the mailing program. At step S208, the attachment detector determines whether the user has selected an attachment. If so, the email may be sent without further analysis (step S210). If at step S208, no attachment has been detected, the method proceeds to step S212. At step S212, a portion of the message for analysis is selected. For example, the relevant part(s) of the email are detected. This means that, when replying to or forwarding an email, the text corresponding to the original email (which may be interleaved with the text written by the user) may first be discarded. The mailing program 30 may have this capability. If not, the attachment verification system 32 includes instructions for identifying the content of the original email and the content which has been typed by the user.

At step S214, the language is detected, either at the sentence, paragraph or email level. The language model 38 is selected according to the detected language (English in the embodiment illustrated in FIG. 2). At step S216, a string of text is selected for analysis. In one embodiment, an overlapping sliding window 70 of a string of K words is moved along the text. K may be a fixed number of words which is larger than the selected N-gram size. In one embodiment, K may range from about 5 to 20, e.g., 10. The sliding step may move the window 70 a fixed number of words, e.g., one word between each probability analysis. For each string of K words, the log-probability of the string is computed on SLM+ (step S218) using Eqn. 5.

If a window 70 has a probability (or log probability) below a preselected first threshold $\theta_2$ (which may have the same value as $\theta_1$ or a different value), the attachment verification system 32 considers that it does not refer to an attachment and this window is ignored. The window 70 is then moved to a new position, e.g., one word to the right of the first string of K words, and the process repeated.

For purposes of determining a window, punctuation, such as periods and commas may be ignored. Thus, a window 70 may span portions of two (or more) sentences, as illustrated in FIG. 2. By way of example, for the highlighted window, in the case of a bigram language model, Eqn 5 corresponds to:

$$\log P(W) = \log P(by|sent) + \log P(sent|be) + \log P(be|will) + \log P(will|tickets) + \log P(tickets|your) + \log P(your|attached) + \log P(attached|are) + \log P(are|requested) + \log P(requested|you) + \log P(you).$$

where each of the values of log P may be retrieved from SLM+.

In the above described method, every possible N-gram 80 in the text string 70 is used in computing the value of log P(W). Thus, for a window where K is 10 and a bi-gram model is used, the stored probability values for nine bi-grams (and optionally 1 unigram, log P(you), in the example illustrated) are used to compute the probability log P(W). However, it is also contemplated that the probability log P(W) may be computed on fewer than the maximum number, for example on five of the bi-grams. In general, however, the value of log P(W) is computed on a preselected number of text sequences 80 in the text string 70.

In another embodiment, the log probability may be computed at the sentence level, i.e., on a text string of variable length. In this embodiment, the probability value may be normalized according to the number of words in the sentence or otherwise adjusted so that the determined probability is largely independent of the number of words in the sentence.

If no window in the portion of the message to be analyzed has a probability value which exceeds $\theta_2$, the method proceeds to step S210 and the email message is automatically sent. The process may thus be completed without any notification to the user that the email was checked.

If at step S218 the window has a score on SLM+ which is higher than $\theta_2$, the method proceeds to step S220, where the window is scored on SLM−. At step S222, the log-probability difference log $P(W)_d$ is computed using the probabilities for SLM+ and SLM− determined using Eqn. 5 in steps and S218 and S220.

$$\log P(W)_d = P(W)_{SLM+} - \log P(W)_{SLM-} \qquad \text{Eqn. 7}$$

where log $P(W)_{SLM+}$ is the log probability computed using probability values retrieved from SLM+ and log $P(W)_{SLM-}$ is the log probability computed using probability values retrieved from SLM−.

The computational requirements of this approach can be very low as the log probabilities $\log P(w_i|h_i)$ can be stored directly and the score computation is a mere summation.

For each window 70, if the log-probability difference exceeds a preselected second threshold $\theta_3$, then the text string is considered to refer to an attachment. If the log-probability difference is below $\theta_3$, then the window is considered not to refer to an attachment. If no window 70 in the examined portion of the email message has a probability above $\theta_3$, then the email is considered not to refer to an attachment and the email is automatically sent (step S110).

If at least one window 70 in the portion of the email body analyzed is considered to refer to an attachment (i.e., above $\theta_3$), then the method proceeds to step S224. Once such a window is identified, no further windows need to be evaluated. The sender is signaled by a visual, audible, or combination audiovisual sensory cues that the desirability of an attachment to the message is probable, and/or otherwise prompted to consider whether to include an attachment (step S224). The prompt may be an on-screen display (e.g., pop-up window, drop-down flag, etc.), a tone, synthesized speech, or a combination thereof. For example, at step S224, the dialog box 72 is opened. The dialog box displays a prompt for the user, in the language of the attachment verification system 32, such as "Attach a document?" At step S226 the user may elect to send an attachment. For example, the user may select to attach a document by utilizing the attachment button 74. A file browsing and attachment feature may then be engaged to retrieve and attach a file. Or the user may indicate, for example by checking a "send without attachment" pop up button 90, that the user does not wish to send an attachment. The method ends at step S228.

FIG. 5 illustrates the method for a simplified language model 38 which relies solely on SLM+. The method begins at step S300. Steps S302, S304, S306, S308, S310, S312, S314, S316, and S318 are analogous to the steps S202, S204, S206, S208, S210, S212, S214, S216, and S218 respectively, of FIG. 3. If at step S314, a window has a probability (or log probability) below a preselected threshold $\theta_4$, which may be the same as $\theta_3$, or somewhat higher, the attachment verification system 32 considers that it does not refer to an attachment and this window is ignored. If at step S318 the window has a score on SLM+ which is higher than $\theta_4$, the text string is considered to refer to an attachment. If at least one window in the examined portion of the email body is considered to refer to an attachment (i.e., above $\theta_4$), then the method proceeds to steps S324 and S326, which are analogous to steps S224 and S226. The method ends at step S328.

In one embodiment, the attachment verification system 32 includes a learning module which includes instructions for adapting the language model (specifically, SLM+ and/or SLM−) to the specific writing patterns of the user through incremental learning. Users often have a limited set of expressions which they use when referring to an attachment, which may vary depending, for example, on their level of formality when writing. The learning module may use two types of event to adapt the language model 38. The first type of event is when the attachment verification system 32 detects one or multiple strings of words with probability values which indicate that a document should be attached to the email, but the user selects not to attach a document when prompted. If the user decides to send the email as is, it is probable that the detected sequence(s) do not refer to an attachment. In such instances, the learning module may adapt the language model for the corresponding sequence(s) in the email. For example, the probability values for SLM− may be raised and/or the probability values used for the SLM+ may be lowered. The second type of event is when the user decides to attach a document before sending the email. It is likely that the detected sequence(s) refer to an attachment. In such cases, the parameters of the language model may be updated to increase the probability of the corresponding sequence(s) for SLM+.

In one embodiment, a Maximum a Posteriori (MAP) adaptation of the parameters of a language model 38 is employed. Similar techniques have been used in the field of Automatic Speech Recognition (ASR). In particular, that MAP only adapts those parameters P(w|h) for which the history h was observed in the detected sequence(s) of words. For example, let $P^g(w|h)$ be the general language model estimated offline on a large corpus and let $P^n(w|h)$ be the language model as estimated on the detected sequences. Then, in the case where the attachment verification system 32 correctly detected a sequence relating to an attachment, SLM− may be unchanged and the MAP estimate for P(w|h) in SLM+ may be derived from:

$$P(w|h) = (1-\alpha)P^g(w|h) + \alpha P^n(w|h) \qquad \text{Eqn. 8}$$

The parameter $\alpha$ keeps a balance between the information brought by the old evidence and the new evidence. It is generally set to a small value to place more weight on the probability values derived from the larger sampling from the second corpus. For example, $\alpha$ may have a value of about 0.1 or less. In the case where the attachment verification system 32 inaccurately detected an attachment (e.g., based on the fact that the user declined to attach an email when prompted), Eqn. 8 may be applied to SLM− and SLM+ may be left unchanged.

In the system of FIG. 5, where SLM− is not used, a second parameter $\beta$ may be used for modifying probability values for the single SLM where the attachment verification system 32 wrongly detects that the email implies an attachment, as follows:

$$(1+\beta)P^g(w|h) - \beta P^n(w|h) \qquad \text{Eqn. 9}$$

The parameter $\beta$ may be set so as to ensure that all probabilities remain positive.

Further details on MAP adaptation of SLMs, are provided in M. Bacchiani and B. Roark, "Unsupervised Language Model Adaptation," ICASSP, 2003.

In another embodiment, the learning module may automatically scan email messages to which the user has decided to attach an email without prompting. If the learning module finds no text string which has a probability value P which exceeds the threshold, the learning module may request that the user identifies the sentence or other text string which refers to the attachment, for example, in a pop-up box. The user may highlight a portion of text, for example by dragging the cursor over the text. The learning module may then modify the probabilities of one or more of the N-grams present in the highlighted text portion.

In yet another embodiment, the user may interact with the attachment verification system 32 by inputting phrases commonly used to indicate an attachment. The learning module may adapt the probabilities accordingly.

The following simple example demonstrates the effectiveness of considering word sequences, rather than simply the occurrence of key words. A sentence such as "Here is the document you requested." most likely refers to an attachment while the sentence "The document you requested is here: /opt/ipc2" is unlikely to refer to an attachment. However, both sentences contain almost exactly the same words (except for the path /opt/ipc2). Thus an approach based on word statistics would consider that both sentences relate to an attachment (or not). In contrast, the exemplary SLM 38 considers word sequences. It is thus able to distinguish between these two sentences, given appropriate training material.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for processing electronic mail comprising:
computing a probability that a text string in an electronic mail message refers to an attachment as a function of a stored probability value for each of a plurality of sequences of words within the text string, the computing of the probability including computing a first probability that the text string refers to an attachment using a first set of stored probability values and, where the first probability exceeds a predetermined value, computing a second probability that the text string does not refer to an attachment using a second set of stored probability values, the probability that a text string in an electronic mail message refers to an attachment being computed as a function of the first and second probabilities; and
where the electronic mail message lacks an attachment, prompting a user if the computed probability indicates that the text string refers to an attachment.

2. The method of claim 1, further comprising:
prior to computing the probability, identifying whether the electronic message lacks an attachment.

3. The method of claim 1 wherein at least some of the stored probabilities are derived from a corpus of email message text which refers to an attachment.

4. The method of claim 1, wherein the first set of probability values are derived from a first corpus of email message text strings determined to refer to an attachment and the second set of probability values are derived from a second corpus of email message text strings determined not to refer to an attachment.

5. The method of claim 1, wherein the computing of the probability includes summing log probability values for each of the plurality of sequences of words.

6. The method of claim 1, wherein the method further comprises:
for each of a plurality of text strings in the electronic mail message, computing a probability that the text string refers to an attachment as a function of a stored probability value for each of a plurality of sequences of words within the text string.

7. The method of claim 6, wherein when none of the plurality of text strings has a computed probability which exceeds a threshold value, sending the electronic mail message without prompting the user.

8. The method of claim 1, wherein the computing of the probability that the text string refers to an attachment includes identifying a preselected number of sequences of words in the text string, retrieving stored probability values for each of the identified sequences, and computing the probability as a function of the retrieved probability values.

9. The method of claim 1, wherein the text string comprises a predetermined fixed number of words.

10. The method of claim 1, wherein each sequence of words comprises the same number of words.

11. The method of claim 1, further comprising, prior to computing the probability, identifying a language of the electronic mail message.

12. The method of claim 1, further comprising, prior to computing the probability, identifying a portion of the electronic mail message prepared by the user and computing the probability for a text string in the identified portion.

13. The method of claim 1, wherein the prompting includes displaying a query to the user on a screen.

14. The method of claim 1, further comprising adapting at least one stored probability value to the writing patterns of the user.

15. A system for processing electronic mail comprising:
a statistical language model which stores probability values for a plurality of text sequences, the statistical language model including a first statistical language model component which models the probability that a text sequence of an electronic mail message refers to an attachment and a second statistical language model component which models the probability that a text sequence of an electronic mail message does not refer to an attachment; and
a processor which executes instructions for retrieving stored probability values from the statistical language model for a plurality of text sequences in the electronic mail message and computing a probability that that the electronic mail message refers to an attachment as a function of the retrieved probability values, the instructions including instructions for computing a first probability for each of the text sequences using the first statistical language model component and instructions for computing a second probability for each text sequence using the second statistical language model component, the instructions for computing the probability that the electronic mail message refers to an attachment including instructions for computing a function of the first and second probabilities.

16. The system of claim 15, wherein the processor executes instructions for prompting a user when the computed probability that the electronic mail message refers to an attachment exceeds a threshold value.

17. A method for processing electronic mail comprising:
analyzing words of text strings of an electronic mail message with a statistical language model to determine whether one of the string has at least a threshold probability of referring to an attachment, each text string comprising an N-gram having a fixed number N of words, the probability of the text string being computed as a function of the individual probability of each word in the text string, the individual probability of said each word being the probability of said word in combination with the words history, the history comprising previous words to said word in the electronic mail message, where present; and
where the electronic mail message lacks an attachment and the text string is determined to have at least the threshold probability that the text string refers to an attachment, prompting a user.

18. A method for processing electronic mail comprising:
stepwise moving a sliding window of a string K of words along a text string of an electronic mail message and at each sliding step:
computing a probability for the window including using a first statistical language model component which models the probability that a text sequence of an electronic mail message refers to an attachment,
optionally, if the probability exceeds a threshold, computing a probability for the window using a second statistical language model component which models the probability that a text sequence of an electronic mail message does not refer to an attachment; and where the electronic mail message lacks an attachment, prompting a user if a computed probability for at least one window indicates that the text string refers to an attachment, the computed probability being based on the probability computed using the first statistical language model component and optionally on the probability computed using the second statistical language model component.

* * * * *